United States Patent [19]
Link et al.

[11] Patent Number: 6,012,096
[45] Date of Patent: Jan. 4, 2000

[54] METHOD AND SYSTEM FOR PEER-TO-PEER NETWORK LATENCY MEASUREMENT

[75] Inventors: Craig A. Link, Seattle; Hoon Im, Bellevue, both of Wash.

[73] Assignee: Microsoft Corporation, Redmond, Wash.

[21] Appl. No.: 09/065,377

[22] Filed: Apr. 23, 1998

[51] Int. Cl.[7] .................................................. G06F 13/00
[52] U.S. Cl. ............................................................ 709/233
[58] Field of Search ....................... 364/DIG. 1 MS File, 364/DIG. 2 MS File; 463/42; 709/200, 203, 219, 227, 228, 232, 233, 235, 224

[56] References Cited

U.S. PATENT DOCUMENTS

| | | | |
|---|---|---|---|
| 5,695,400 | 12/1997 | Fennell, Jr. et al. | 463/42 |
| 5,899,810 | 5/1999 | Smith | 463/42 |

OTHER PUBLICATIONS

Lynch et al. "Tools For Network Management" Chapter 13.3.1.6 Ping Internet System Hand Book pp. 531–532, 1994.

*Primary Examiner*—Robert B. Harrell
*Attorney, Agent, or Firm*—Law Offices of Albert S. Michalik

[57] ABSTRACT

A method and system for determining network latency between clients in a computer network, such as in a gaming zone environment. Each client determines the network latency between each other client via a ping, response, and response-response protocol. To this end, a first client places first time information such as a timestamp into a (ping) data packet and sends the packet to the second client, who places second time information into the packet, and sends the packet as a response packet back to the first client. The first client determines a first network latency based on its current time and the first time information returned in the response packet. The first client then sends the packet back to the second client as a response to the response packet. The second client determines a second latency based on the current time information at the second client and the second time information received in the response-response packet. For multiple clients such as in a gaming zone environment, each local client sorts the IP addresses of the other remote clients into sets of clients, and pings the remote client or clients in each set once per predetermined period, thereby distributing the pinging operation to balance incoming and outgoing network traffic.

21 Claims, 9 Drawing Sheets

| | | |
|---|---|---|
| 0 → | IP Address$_0$ | Latency |
| 1 → | IP Address$_1$ | Latency |
| 2 → | IP Address$_2$ | Latency |
| 3 → | IP Address$_3$ | Latency |
| → | IP Address$_4$ | Latency |
| 4 → | IP Address$_5$ | Latency |
| 5 → | IP Address$_6$ | Latency |
| 6 → | | Latency |
| 7 → | IP Address$_7$ | Latency |
| 8 → | IP Address$_8$ | Latency |
| 9 → | IP Address$_9$ | Latency |
| 10 → | IP Address$_{10}$ | Latency |

Table of IP Addresses and Latency Measurements

*FIG. 3*

METHOD AND SYSTEM FOR PEER-TO-PEER NETWORK LATENCY MEASUREMENT

FIELD OF THE INVENTION

The invention relates generally to computer systems and Internet gaming applications, and more particularly to a method and system for measuring latency to predict the gaming experience of players in a peer-to-peer computing environment.

BACKGROUND OF THE INVENTION

A gaming zone, such as the Microsoft Internet Gaming Zone, is an online gaming website on the Internet to which users connect in order to find other Internet users for playing an online computer game therewith. Many contemporary online computer games operate over a peer-to-peer network protocol, in which game play is via communication between the users' computers rather than via a centralized datacenter. With a peer-to-peer network protocol, a user's computer is thus communicating with every other users' computer in the game.

A significant problem for gaming zone players of peer-to-peer games is that the amount of time it takes for a piece of data to travel from one computer over a network to another computer, known as latency, can be highly variable across users. For example, computer connections to the Internet may vary among users from slow, dial-up 28.8 kbps modems to high-speed T1 and T3 connections, with any number of machines routing packets in between. This can result in latencies from fifty milliseconds to greater than one second. When a user with high or inconsistent latency participates in an online game, the game will often slow down, periodically pause, or fail to last to completion, resulting in user frustration and a less than satisfactory gaming experience.

In contrast to peer-to-peer games, when a user is contemplating playing a game via a centralized datacenter, the user is able to look at a predicted latency value, which can be easily determined by measuring the amount of time it takes for data to be returned from the centralized datacenter. The user can decide whether to play the game based on the predicted latency. Analogously, to accurately predict the gaming experience in a peer-to-peer game, each player would need to know the latency of each other player that is going to be involved in the game. However, in a peer-to-peer game, the number of users concurrently looking to join a game with other players (matchmaking) can be quite large, often on the order of hundreds of players. Consequently, taking this many latency measurements can substantially increase network traffic, to a point where the network traffic adversely and unrealistically affects the latency measurement, especially on lower bandwidth connections. As a result, there has heretofore been no adequate way in which to measure latency in peer-to-peer computing environments.

SUMMARY OF THE INVENTION

Briefly, the present invention provides a method and system for determining network latency between clients in a computer network having at least two clients connected thereto in a manner that reduces network traffic at any given time. To determine the latency between a first and a second client, the first client places first time information such as a timestamp into a (ping) data packet and sends the packet to the second client. The second client receives the packet at the second client, places second time information into the packet, and sends the (modified) packet as a response packet to the first client. The first client receives the response packet and determines a first network latency based on current time information at the first client and the first time information that was returned in the packet. The first client then sends the packet back to the second client as a response to the response packet. The second client receives the response-response packet, and determines a second network latency based on the current time information at the second client and the second time information in the packet. The first client may also send the first network latency in the response-response packet to the second client, whereby the second client may further use the first latency in determining the second latency.

For multiple clients such as in a gaming zone environment, each local client sorts the IP addresses of the remote clients into sets of clients, and pings the remote client or clients in each set once per predetermined period. This distributes the pinging operation to balance incoming and outgoing network traffic over the full measurement period. The present invention also bitpacks the timestamps to reduce the number of bytes sent in each packet, further reducing network traffic.

Other advantages will become apparent from the following detailed description when taken in conjunction with the drawings, in which:

BRIEF DESCRIPTION OF THE DRAWINGS

FIG. 3 is a representation of a table of IP addresses and measured latencies corresponding thereto;

DETAILED DESCRIPTION

Figure 1:
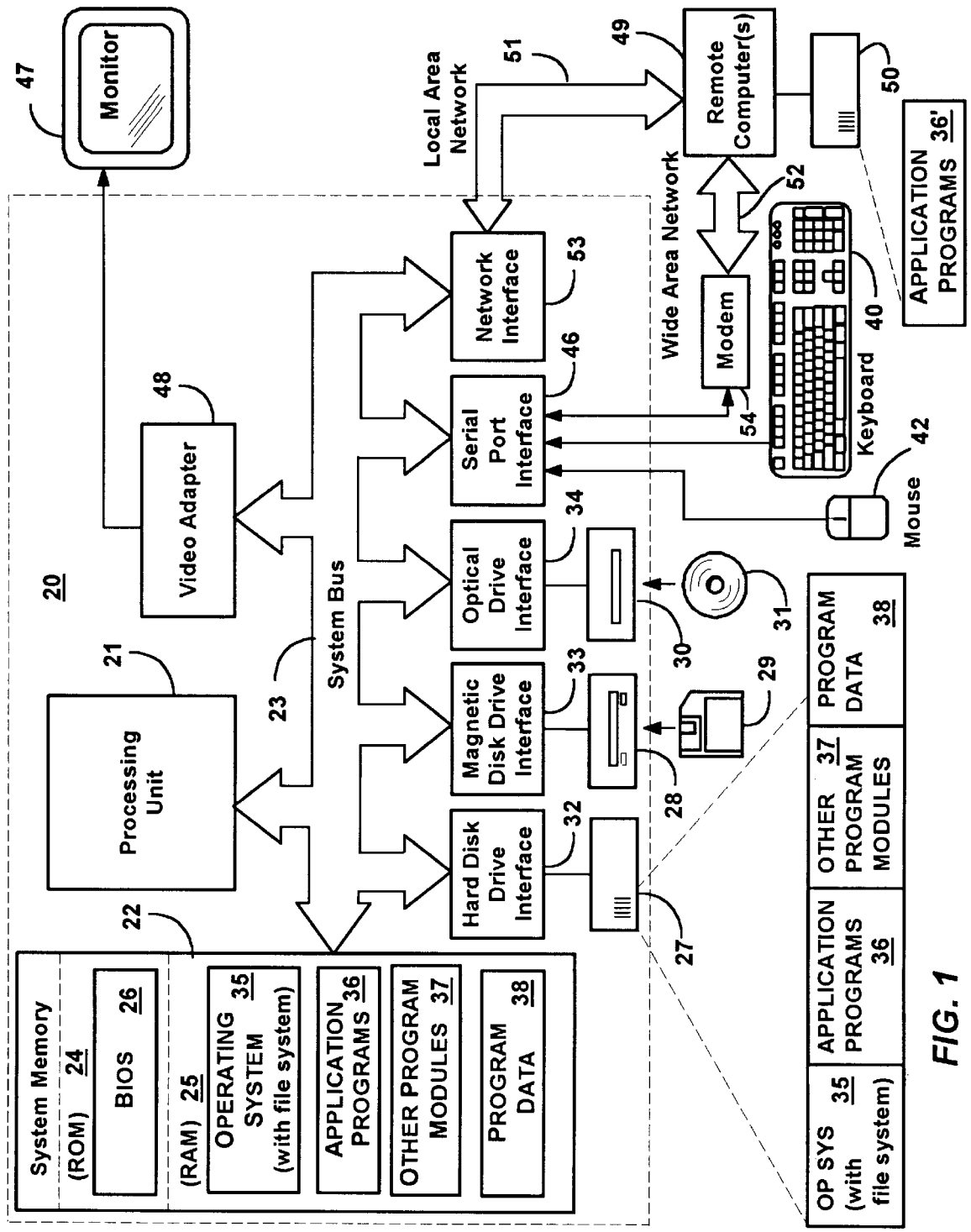
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary, and other means of establishing a communications link between the computers may be used.

As described herein, the personal computer 20 may serve as one client, and the remote computer 49 as another client, connected to each other via a gaming zone (Internet site). For purposes of simplicity, the numerous other computers that may be interconnected via the gaming zone are not shown herein, however it is understood that each such computer may implement the present invention via similar components.

Figure 2:
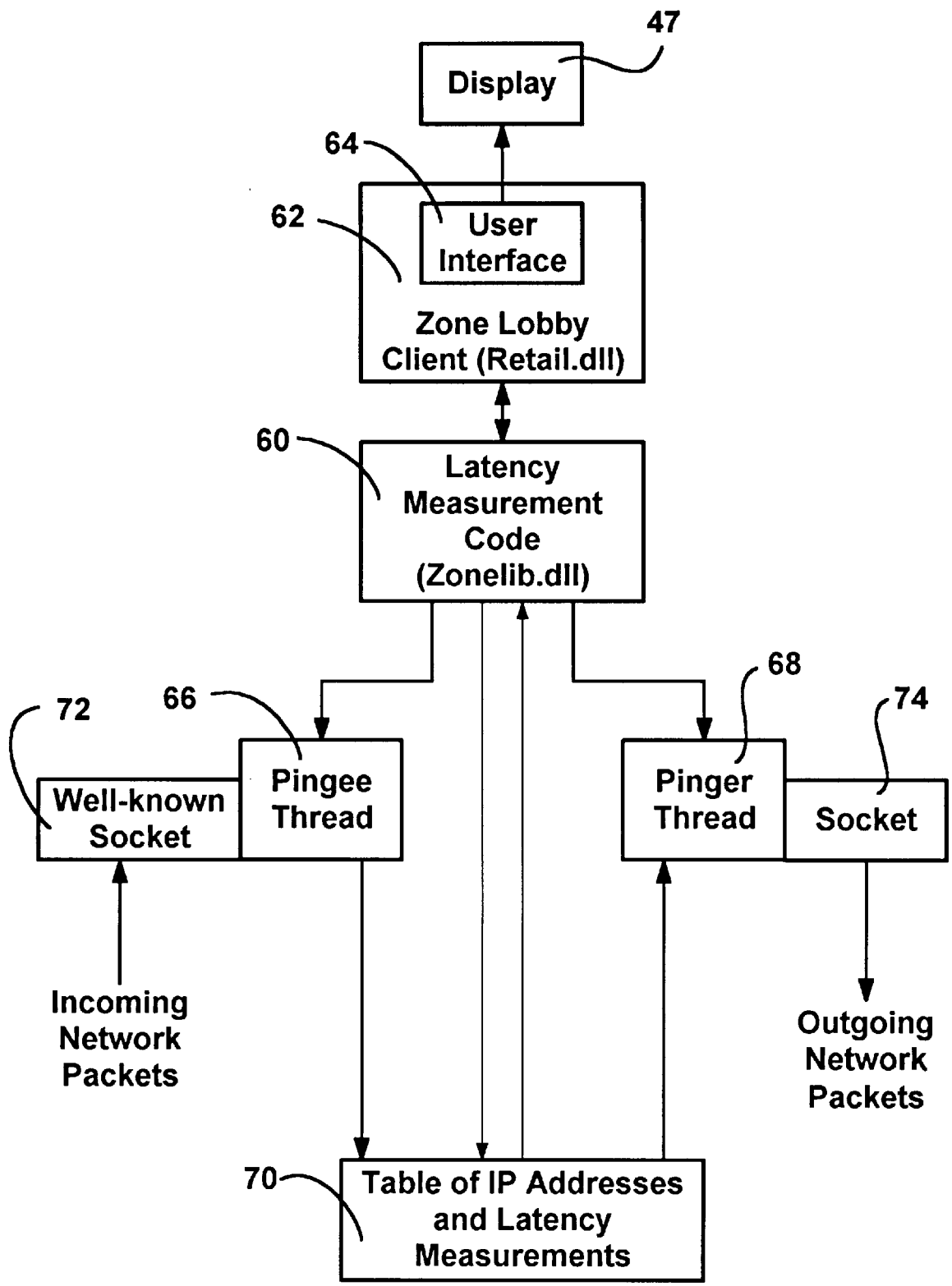
FIG. 2 is a block diagram representing general components for implementing the present invention.

FIG. 2 represents various exemplary components that are present on each machine capable of implementing the present invention (such as the personal computer 20) that is connected to the gaming zone. Latency measurement code 60 is installed on the system 20, such as in part of a dynamic link library (ZONELIB.DLL) installed on a user computer as part of the Microsoft Internet Gaming Zone setup. The installation may take place when a game is installed on a system, such as via a CD-ROM installation or downloading procedure. A zone retail matchmaking lobby 62, such as residing in a dynamic link library named RETAIL.DLL and made available on a CD-ROM, website or the like comprising gaming software, utilizes the latency measurement code 60. In particular, the zone retail matchmaking lobby 62 includes a user interface 64, that (among other functions) displays on the display 47 a representation of the measured latencies, as described in more detail below.

The latency measurement code 60 is a self contained library which during execution utilizes two threads 66, 68, a table of Internet protocol (IP) addresses 70, and a well-known socket 72. Upon initialization of the zone lobby 62, the lobby 62 interfaces with the latency measurement code 60 to create the well-known socket 72 (at present using a port setting of 28,800) and one of the threads, a listening thread known as a Pinger thread 66, which listens on the socket for incoming network data.

After initialization, the zone lobby client 62 interfaces with the latency measurement code 60 (via an Add(IP)

interface), to add IP addresses to the IP address table 70. The IP addresses that are added correspond to the addresses of other users' computers connected to the gaming lobby. Once the table has the IP addresses added thereto, the pinger thread 68 is created to begin measuring the latencies of the other players. Note that as users enter and leave the lobby, the lobby client adds and removes IP address from Latency measurement code 60 as appropriate. Thus, a Remove(IP) interface is also provided so that the zone lobby client 62 can remove players who leave the lobby from the IP address table 70.

Figure 4:
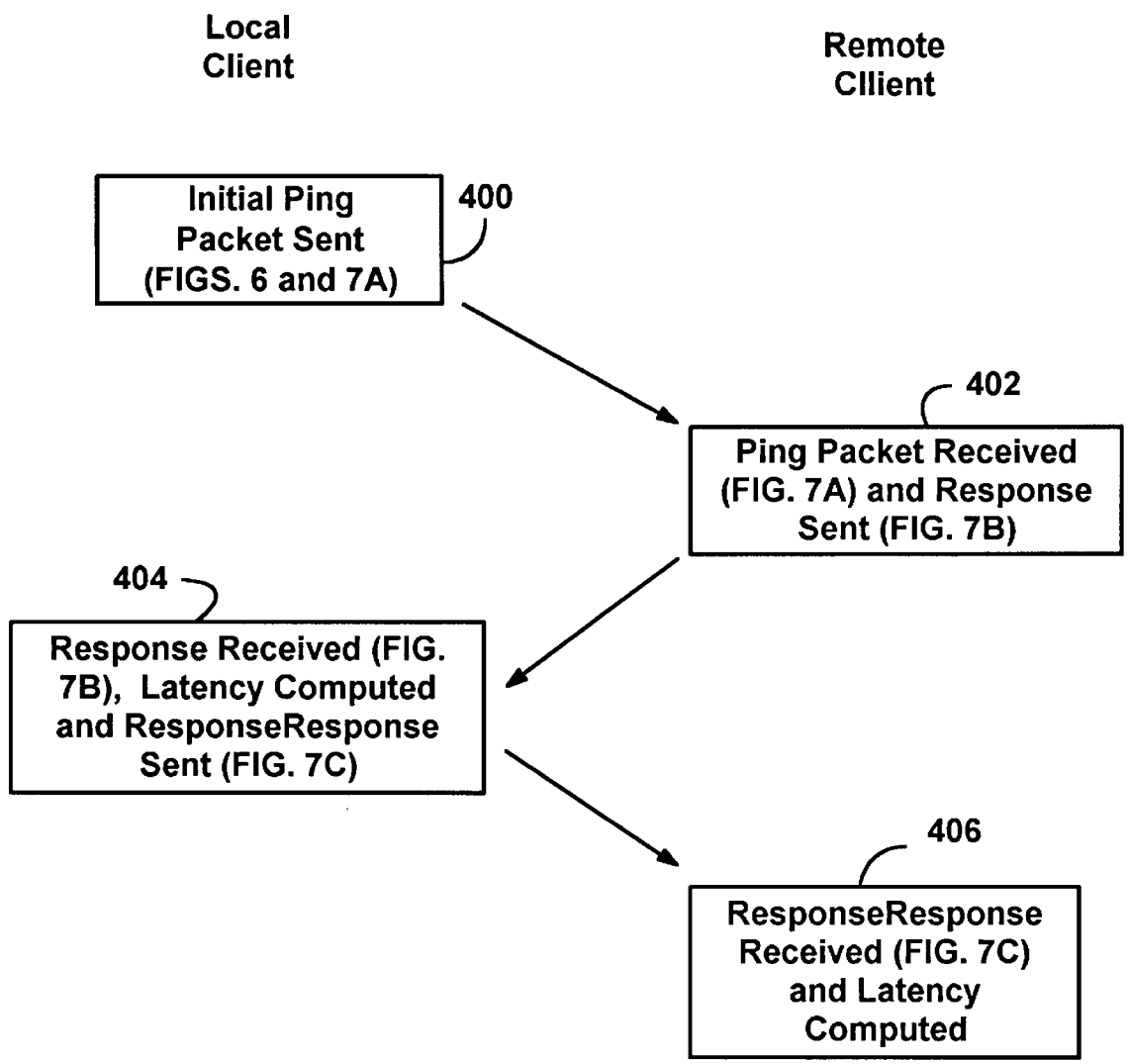
FIG. 4 is a timing chart representing the exchange of packets between peer-to-peer clients to measure latency in accordance with one aspect of the present invention.

In accordance with one aspect of the present invention, as generally represented in FIG. 4, any two clients are able to exchange sufficient information to each calculate the latency therebetween with only three packets being transmitted. In general, this is accomplished via a ping, response, response-response protocol as generally shown in FIG. 4. One client (e.g., the local client) sends an initial ping packet to another (e.g., a remote) client at step 400. The initial ping packet includes the local client's current timestamp. When the remote client receives the initial packet at step 402, the remote client (essentially immediately) responds with a response packet, wherein the response packet includes the remote client's current timestamp along with the other timestamp, which is left intact. When the local client receives the response at some later time (step 404), the local client is able to determine the latency based on the new current (now later) time minus the earlier time saved in the local machine's timestamp. At step 406, the local client also responds with a response-response packet to return the timestamp of the remote client to the remote client. The remote client is then able to calculate the latency from its current time minus the time in its saved timestamp. As described below, the local machine may also include the result of its latency calculation in the response-response packet, whereby the remote machine may average the two measured latencies for a better time estimate. As can be readily appreciated, the mechanism of the present invention that exchanges three packets significantly reduces network traffic relative to a local ping—remote response, remote ping—local response (four packet) mechanism. The general steps 400–406 are described in more detail below with respect to FIGS. 7–9.

In accordance with another aspect of the present invention, the pinger thread 68 pings only a subset of the various remote clients per a given time interval. This reduces the amount of network traffic at any one time, whereby latency measurements are not adversely affected by having too much network traffic at one time. To this end, a hash function or the like is used when storing the IP addresses to hash the addresses into subsets of locations in the IP address table 70, and only the remote computers having addresses in one subset location are pinged per interval. At present, a two-second interval between pinging subsets of the remote computers is used, since some latencies are as much as one second and a smaller interval could result in ping responses backing up. The number of table locations thus depends on the frequency that each user is to be pinged along with the desired interval. By way of example, to ping each user once every twenty seconds with a two-second interval between subsets of users, ten sets of table locations are used. Note that the actual frequency and interval are preferably configurable at the gaming site and downloaded therefrom, and at present a preferred frequency is to ping each user approximately once every fifteen seconds. However, for purposes of simplicity herein, each user will be pinged once every twenty seconds, with a two-second interval between pinging the subsets of users, such that ten sets of locations (FIG. 3) will be used. Accordingly, a suitable hash function for sorting IP addresses uses the last byte of the IP address and the number of desired subsets:

[(last byte of IP Address) mod (period/interval)].

Thus, for example, an IP address with its last byte equal to twenty-three in a ten subset table would be placed in subset location three. Note that collisions are resolved in a known manner, such as by chaining the addresses into a linked list. Thus, as shown in FIG. 3, one subset location may store more IP addresses than another (e.g., subset location 3 stores IP address$_3$ and IP Address$_4$), and indeed, some subset locations may not store any entries (e.g., subset location 6). Of course, a more complex operation may be performed to ensure an even distribution among the locations, however the above function is both simple and rapid while typically resulting in a reasonable distribution among the subset locations.

Figure 5:
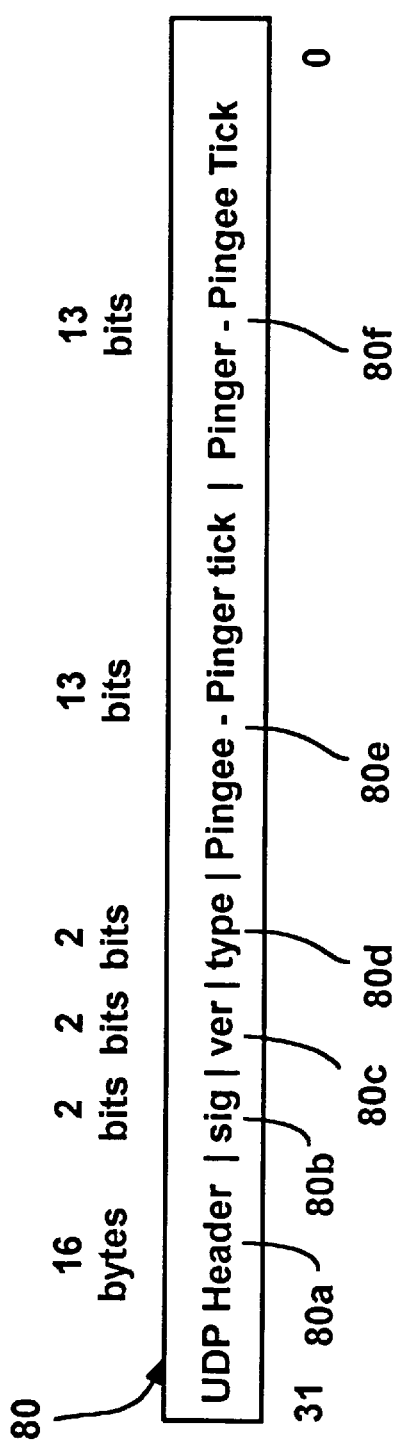
FIG. 5 is a representation of the general structure of a packet used for measuring latencies.
Figure 6:
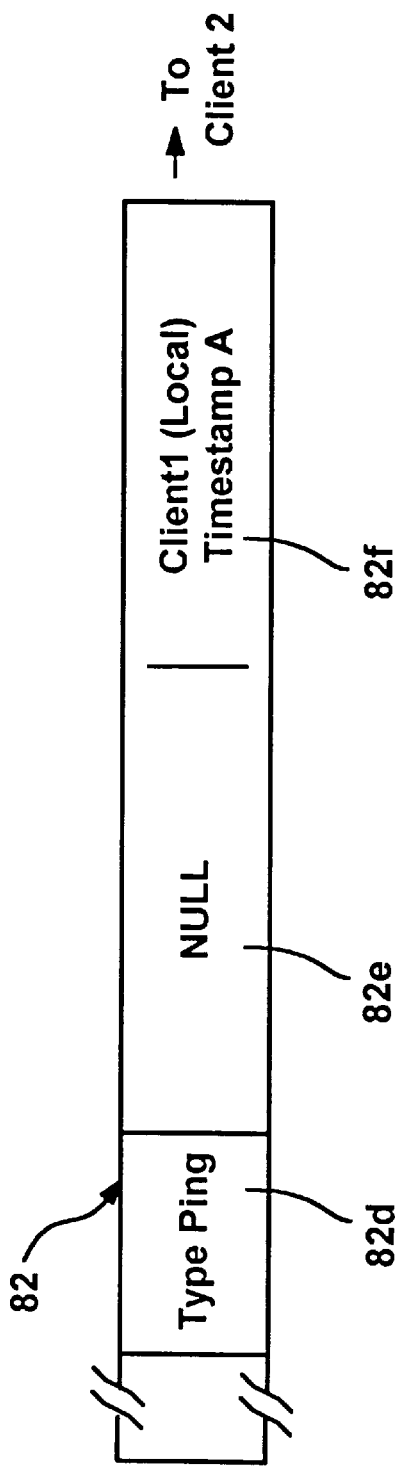
FIG. 6 is a representation of an initial type of packet sent when pinging a remote client to measure latency.

To ping the subsets of users, the pinger thread 68 selects a subset and sends (via an appropriate socket 74) a time-stamped network packet 80 to each of the remote clients having IP addresses in that subset. The general structure of a packet 80 is shown in FIG. 5, wherein an appropriate user datagram protocol (UDP) header 80*a* (e.g., sixteen bytes) is followed by a two-bit signature field 80*b*, a two-bit version identifier 80*c*, a two-bit type field 80*d*, and two thirteen-bit time stamp fields 80*e*, 80*f*. FIG. 6 represents a ping packet 82, wherein the type field 82*f* indicates that this is a ping packet sent by a pinger thread 68, and wherein the pinger thread 68 has added a timestamp corresponding to the local time to the pinger—pinger field 82*f*. The use of a thirteen-bit field for timestamps is described in more detail below.

Figure 7A:
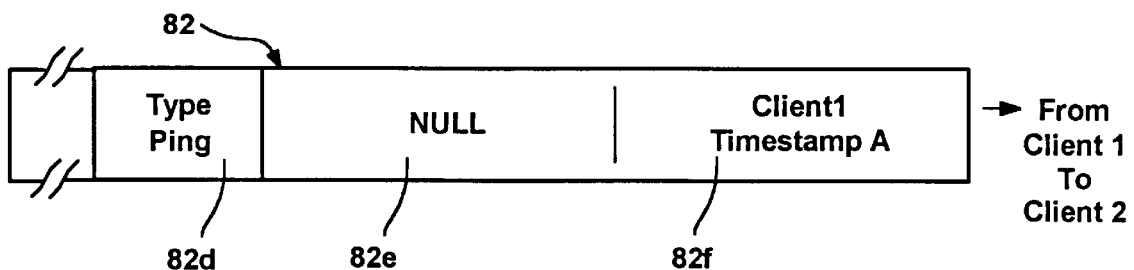
FIGS. 7A, 7B and 7C are representations of an initial packet, a response packet and a response to a response packet, respectively, exchanged between clients to measure latency in accordance with one aspect of the present invention.
Figure 8:
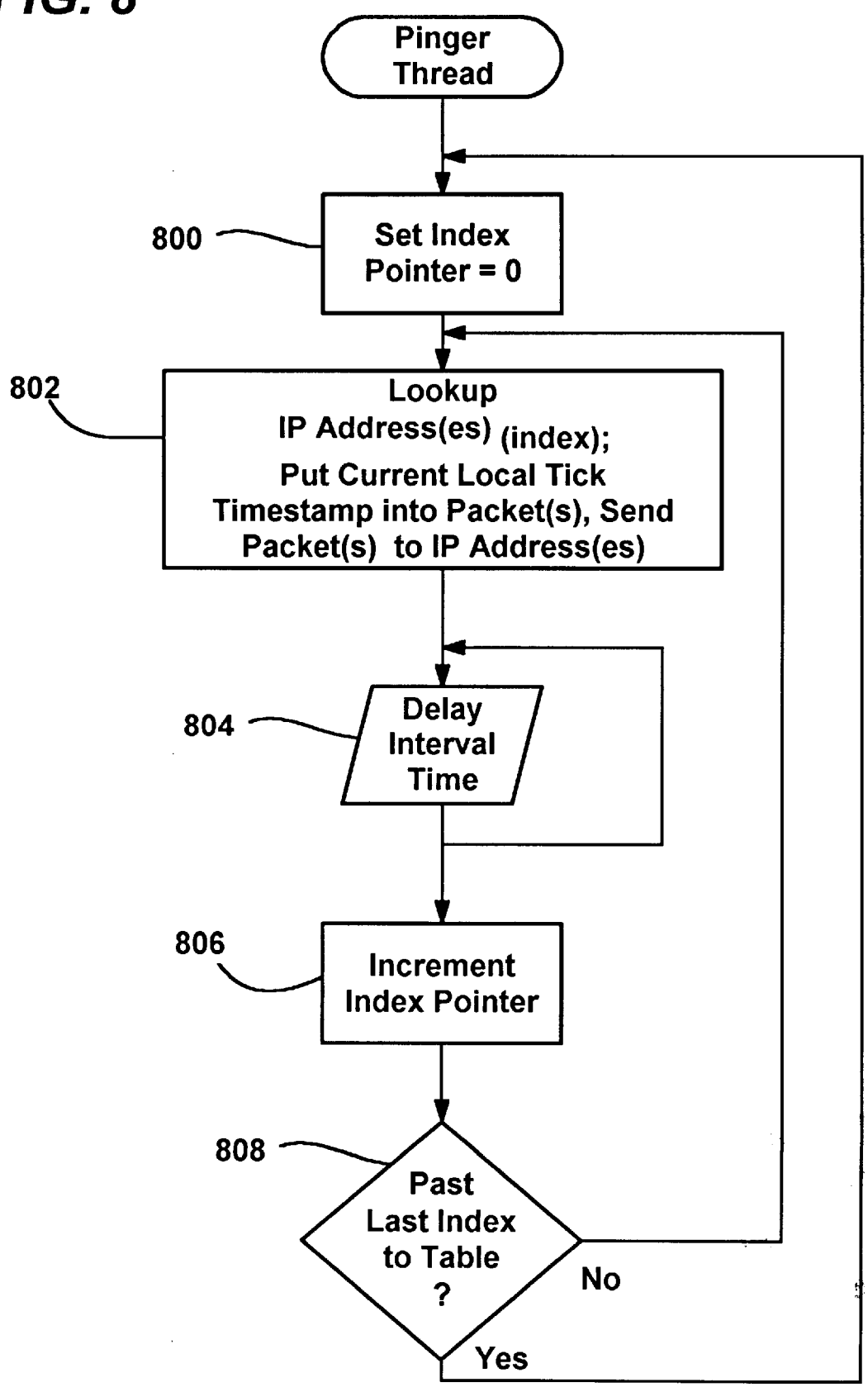
FIG. 8 is a flow diagram generally representing the steps taken by a pinger thread to ping remote clients with initial type packets.

More particularly, as represented in the ping packet 82 of FIG. 7A and the flow diagram of in FIG. 8, the pinger thread 68 begins at step 800 by preparing to start at the first subset of IP address in the table 70, those hashed to subset location (index pointer) zero. At step 802, the pinger thread uses the index to retrieve any IP addresses at that location from the address table 70. At step 802, for each IP address in the subset, the pinger thread 68 puts a local timestamp into the Pinger—Pinger tick field 82f of a Ping-type packet 82 (FIG. 7A), and sends the packet to the remote machine at that IP address. The pinger thread 68 then delays for the interval time (step 804), e.g., for two seconds as described above. At step 806, the pinger thread 68 advances the index pointer to the next subset location in the table 70, resetting to zero as necessary (steps 808 and 800), and repeats the ping for the next set of IP addresses. In this manner, each remote client in the full set thereof is periodically pinged at the desired frequency, (e.g., once every twenty seconds via pinging ten different subsets of clients every two seconds), but in a manner such that network traffic is distributed.

Figure 9:
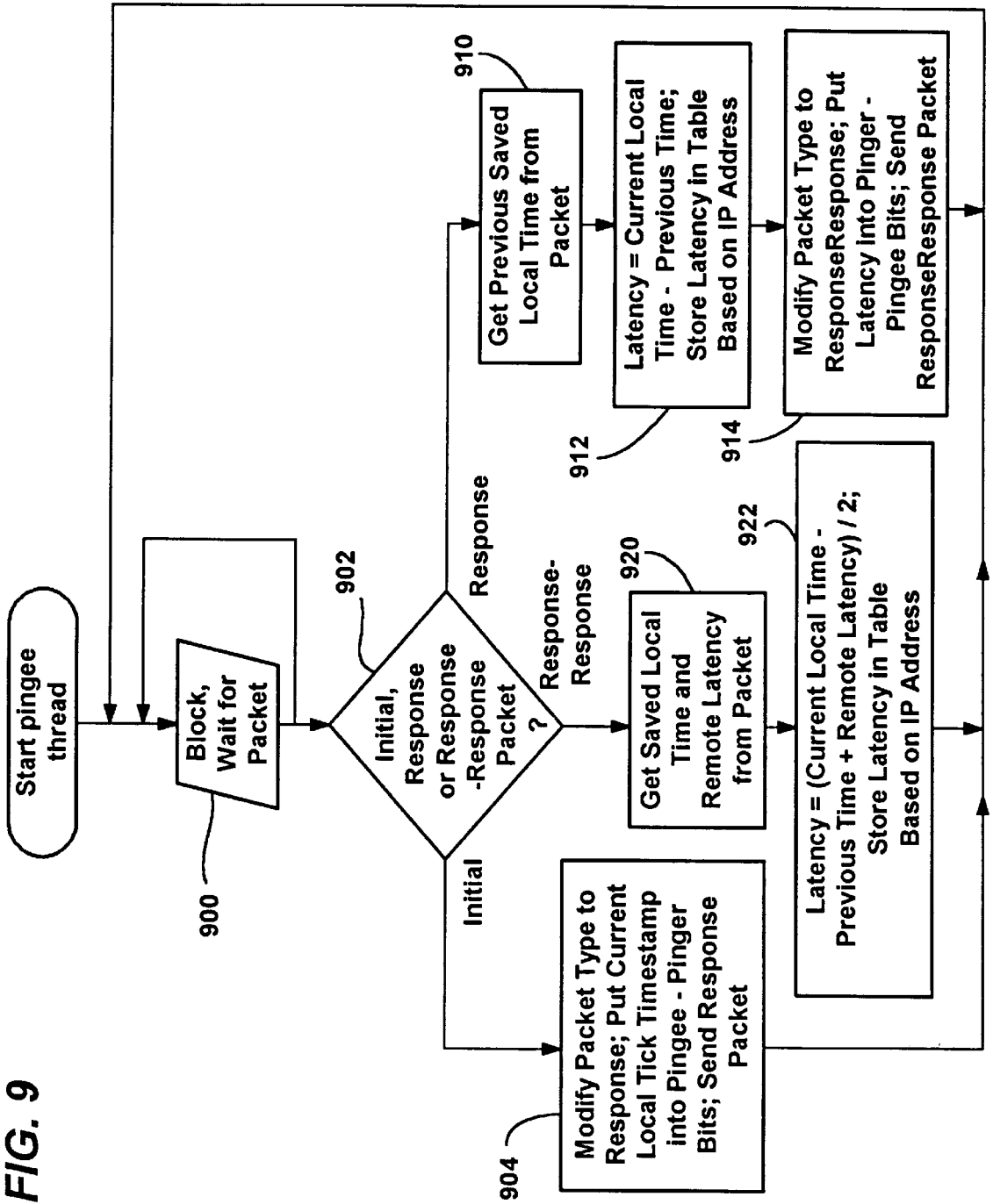
FIG. 9 is a flow diagram generally representing the steps taken by a pinger thread to handle various types of incoming latency packets.

FIG. 9 represents the general steps taken by the pinger thread 66, wherein as shown in step 900, the pinger thread 66 is initially blocked waiting for a packet. When a packet is received, the pinger thread wakes up, and at step 902 evaluates the packet type field 80*d* (FIG. 5) to determine how to handle the packet. In general, the pinger thread 66 (essentially immediately) handles packets in one of three ways, corresponding to the three possible types of packets that may be received. Note that for purposes of simplicity, FIG. 9 does not consider errors such as erroneous packets, (e.g., with an improper signature), however well-known error-handling techniques may be used by the pingee thread 68 for resolving such errors.

Figure 7B:
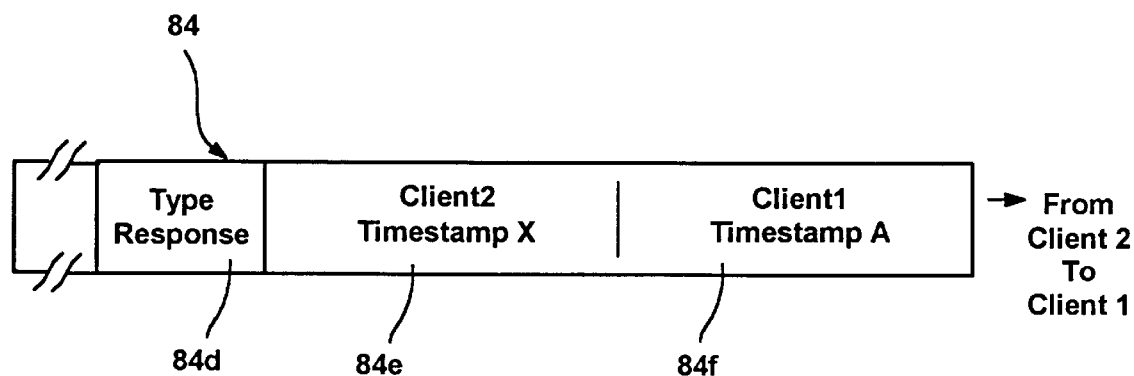

If the received packet is an initial "ping" packet 82 sent from a remote client (e.g. client1), then step 902 branches to step 904 to handle the packet. For example, as shown in FIG. 7A, client2 receives such a packet 82 from client1, whereby step 902 of client2's pingee thread recognizes the type as being a "ping" and branches to step 904. At step 904, the client2's pingee thread modifies the type field of the packet to a response packet type (field 84d of FIG. 7B) and puts client2's current local tick timestamp into pingee—pinger bits 84e of the response packet 84 (FIG. 7B). Client2 then sends the response packet 84 to client1. Note that client1's timestamp is left intact. Also, it should be noted that it is considered equivalent for client2 to alternatively create its own, new response packet, and copy client1's information into the response packet before sending the response.

If the received packet is a response packet 84 sent from a remote client, then step 902 branches to step 910 to handle the packet. For example, as shown in FIG. 7B and as described above, client2 has sent such a response packet 82 to client1, and thus step 902 of client1's pingee thread recognizes the type as a response and branches to step 910. At step 910, the client1's pingee thread first takes client1's previous timestamp from field 84f of the packet 84 (FIG. 7B) and uses it to calculate the latency based on the now later current time:

Latency=Current Local Time−Previous Timestamp Time.

Figure 7C:
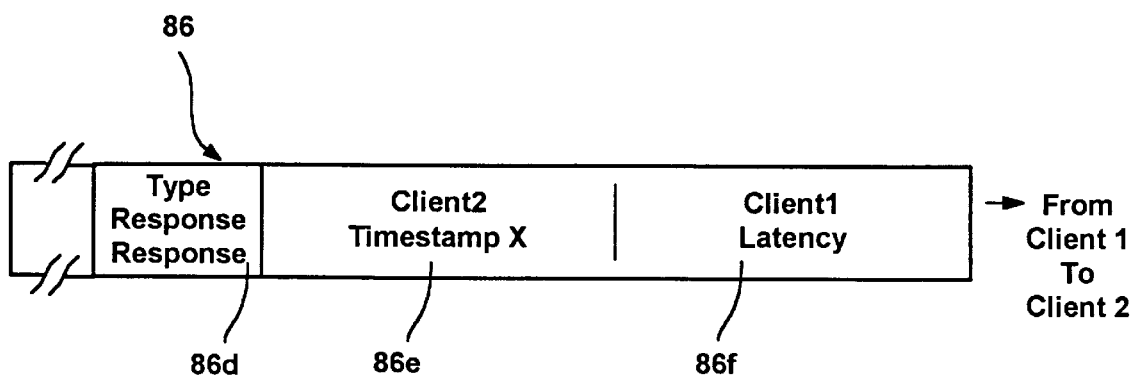

At step 912, the pingee thread of client1 then stores the latency in the IP address table 70, at the storage location therefor corresponding to client2's IP address. At step 914 and as shown in FIG. 7C, the client1 pingee thread lastly modifies the packet type to Response-Response (field 86d), places the calculated latency into the Pinger—Pingee field 86f, and sends the response-response packet to client2.

When client2 receives the response-response packet 86 (FIG. 7C) from client1 at its pingee thread, client2's pingee thread will recognize the type as response-response (step 902) and branch to step 920. At step 920, the client2's pingee thread first takes its own (client2's) previous timestamp from the field 86e of the packet 88 (FIG. 7C). Client2's pingee thread also takes the remote latency calculated by client1 from the field 86f and uses it in combination with client2's previous timestamp and client2's current (now later) time to calculate the latency based on the now later current time:

Latency=(Current Local Time−Previous Time+Remote Latency)/2.

Note that since the remote latency information is available, it is used in an average of the two timed latencies, which is generally a better estimate of the actual latency than that provided by a single measurement. The calculation may also be weighted (e.g., two times the locally measured latency plus the remote latency, divided by three, and so on). At step 922, the pingee thread of client2 then stores the latency in its IP address table 70, at the storage location therefor corresponding to client1's IP address. At this time, the exchange of latency information between these two clients is complete (no further packets are sent) until the pinger thread 68 one of the client's cycles back to again ping the other client.

Figure 10:
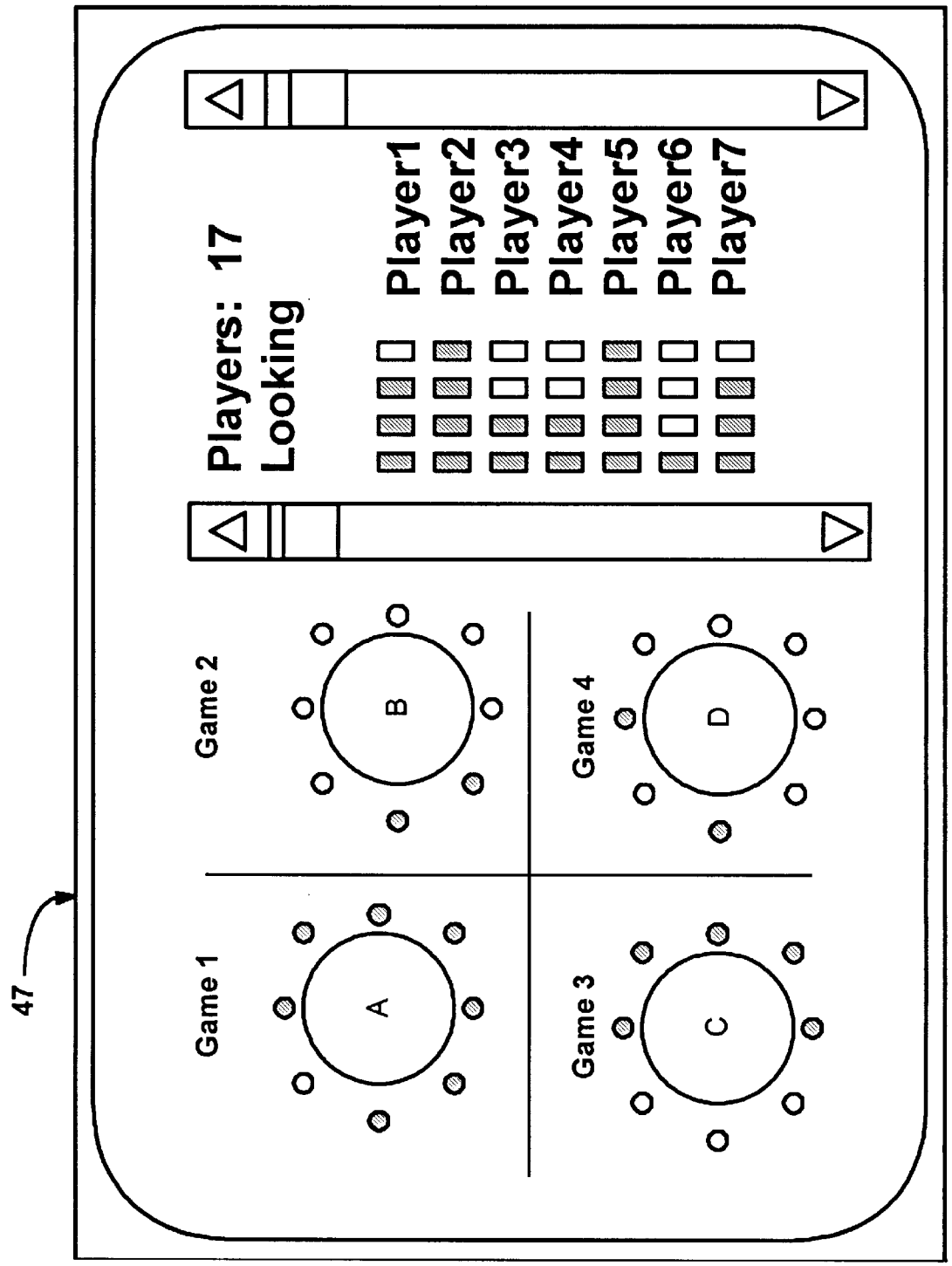
FIG. 10 is a general representation of a user interface for presenting measured latency information to a user.

To display the latencies to the user, the zone lobby component 62 and its user interface 64 periodically retrieves (by querying the latency measurement code 60 via a Lookup (IP) interface) the latencies for the IP addresses, and provides a representation thereof on the display 47. FIG. 10 shows one such representation, wherein latency times are displayed via shaded and unshaded boxes (e.g., the more shaded, the faster the other player), and wherein the zone lobby component has further displayed the IP addresses as corresponding player names for readability. Although not necessary to the invention, the latencies are preferably retrieved at a frequency that is faster than the measurement time for each user, e.g., approximately once every five seconds as opposed to once every fifteen (or twenty) seconds. Since some of the latencies tend to change during this five second interval, the user gets the impression that all user latencies (rather than the actual one-third or one fourth thereof) are being measured once every five seconds.

Moreover, the present invention reduces network traffic by reducing the number of bytes transmitted in each packet. To this end, the timestamps placed in the packets (as described above) are compressed so as to have only thirteen bits each rather than a full thirty-two bit tick count. With the other two-bit fields (signature, version and type) described above, the latency measurement protocol thus only adds four bytes to the packet following the UDP header. Note that this may be accomplished because the tick times are in milliseconds, while the time range into which latency falls into is known. More particularly, using thirteen bits supports a measurement of approximately eight seconds, while poor latency measurements usually have approximately a two-second maximum time, and thus the upper nineteen bits of each thirty-two bit tick time need not be placed in the packets.

Note that, although in a preferred embodiment timestamps are placed into the packets, it is considered equivalent to put any type of information in the packet that is associated with a time. For example, when putting time information into a packet, each thread may maintain an indexed queue, array or the like into which it writes the actual or some relative time, and then place the offset address of the stored time in the packet instead of the actual or relative time. When the packet is returned, the thread takes the offset address stored in the packet, looks up the time stored in its queue, and uses it in the calculation with the corresponding actual current time to determine the latency. Thus, as used herein, "time information," "time," "timestamp," and so on equivalently refer to an actual time, a relative time or any value associated with an actual or relative time, such as an index, pointer, address or the like that enables a system to retrieve and/or the time.

Lastly, although the present invention provides benefits with and has been primarily described with reference to a gaming zone on the Internet, there is no intention to limit the invention to any particular type of use, or to any particular type of network. For example, as can be readily appreciated, the present invention can be used within private and other types of networks, and for purposes other than games.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer network having at least two clients connected thereto, a method of determining network latency between a first and a second client, comprising the steps of, placing first time information into a data packet at the first client, and initially sending the packet to the second client, receiving the packet at the second client, placing second time information into the packet, and sending the packet to the first client, receiving the packet at the first client, determining a first network latency based on current time information at the first client and the first time information in the packet, and secondarily sending the packet to the second client, receiving the packet at the second client, and determining a second network latency based on current time information at the second client and the second time information in the packet.

2. The method of claim 1 further comprising the step of placing the first network latency in the packet secondarily sent to the second client.

3. The method of claim 2 wherein the step of determining a second network latency includes the step of calculating a latency based on a mathematical combination of the first latency, the current time information at the second client and the second time information in the packet.

4. The method of claim 1 wherein the first time information comprises a timestamp.

5. The method of claim 4 wherein the timestamp comprises less bits than the full number of bits used to maintain time at the first client.

6. The method of claim 1 further comprising the step of placing a type identification code in the packet prior to each sending of the packet.

7. The method of claim 1 further comprising the step of displaying a representation of the first network latency on a display of the first client.

8. The method of claim 1 wherein the first client and the second client are connected to a gaming zone of the Internet.

9. In a computer network having a local client and a set of remote clients connected thereto, a method of determining network latency at the local client to each of the remote clients, comprising the steps of, sorting the set of remote clients into subsets thereof, selecting a subset of remote clients, and for each remote client in the subset, placing first time information into a data packet and sending the packet to the remote client, receiving the packet as a response from the remote client, and determining a network latency based on current time information at the first client and the first time information in the packet.

10. The method of claim 9 wherein the step of selecting the subset of remote clients includes the step of periodically selecting each of the subsets.

11. The method of claim 10 further comprising the step of delaying for a predetermined interval between selecting each of the subsets.

12. The method of claim 11 wherein the step of sorting the set of remote clients into subsets thereof comprises the step of hashing via a hash function at least part of the Internet protocol address of each remote client, wherein the hash function is based on the predetermined interval between selecting each of the subsets and a predetermined rate of periodically sending a packet to each of the remote clients in the set thereof.

13. The method of claim 12 further comprising the step of placing the network latency in the response packet sent to the remote client.

14. The method of claim 9 further comprising the step of, for each remote client in the subset, sending a response packet to the remote client in response to receiving the packet as a response from the remote client.

15. The method of claim 9 further comprising the step of, for each remote client in the subset, storing the network latency in association with an identifier of the remote client.

16. The method of claim 9 wherein the step of sorting the set of remote clients into subsets thereof comprises the step of hashing at least part of the Internet protocol address of each remote client.

17. In a computer network having a local client and a set of remote clients connected thereto, a system for determining network latency at the local client to each of the remote clients, comprising, a distribution mechanism for sorting the set of remote clients into subsets of the set, a pinger thread for selecting a subset of remote clients, and for each remote client in the subset, the pinger thread placing first time information into a data packet and sending the packet to the remote client, and a pingee thread for receiving the packet as a response from the remote client, and determining a network latency based on current time information at the first client and the first time information in the packet.

18. The system of claim 17 further comprising a table, wherein the distribution mechanism comprises a hashing mechanism for sorting each of the remote clients into subsets based on a unique identifier thereof, and wherein the distribution mechanism stores the identifier of each remote client in the table in a subset location determined by the hashing mechanism.

19. The system of claim 18 wherein for each remote client, the pingee thread stores the latency determined for that client in the table in association with the unique identifier of that client.

20. The system of claim 19 further comprising a display, and a mechanism for obtaining the latencies stored in the table for at least some of the remote clients and for displaying on the display a representation of the latencies for at least some of the remote clients.

21. The system of claim 18 wherein the unique identifier is an Internet protocol address.

* * * * *